(12) United States Patent
Kraimer et al.

(10) Patent No.: US 7,276,269 B2
(45) Date of Patent: Oct. 2, 2007

(54) FRANGIBLE HEAT-SEALABLE FILMS FOR COOK-IN APPLICATIONS AND PACKAGES MADE THEREOF

(75) Inventors: Amy Lynn Kraimer, Omro, WI (US); Gregory Robert Pockat, Ripon, WI (US)

(73) Assignee: Curwood, Inc., Oshkosh, WI (US)

( * ) Notice: Subject to any disclaimer, the term of this patent is extended or adjusted under 35 U.S.C. 154(b) by 343 days.

(21) Appl. No.: 10/732,023

(22) Filed: Dec. 10, 2003

(65) Prior Publication Data

US 2005/0129811 A1 Jun. 16, 2005

(51) Int. Cl.
*B32B 27/08* (2006.01)

(52) U.S. Cl. .................. 428/35.7; 428/476.9; 428/516; 426/243

(58) Field of Classification Search .............. 428/34.1, 428/35.7, 36.6, 43, 476.9, 515, 516, 520; 426/234, 237, 241, 243; 383/200; 229/87.08, 229/87.11
See application file for complete search history.

(56) References Cited

U.S. PATENT DOCUMENTS

| | | |
|---|---|---|
| 4,284,674 A | 8/1981 | Sheptak |
| 4,355,721 A | 10/1982 | Knott, II et al. |
| 4,419,408 A | 12/1983 | Schmukler et al. |
| 4,469,258 A | 9/1984 | Wright et al. |
| 4,537,836 A | 8/1985 | Adur et al. |
| 4,588,648 A | 5/1986 | Krueger et al. |
| 4,640,852 A | 2/1987 | Ossian |
| 4,683,170 A | 7/1987 | Tse et al. |
| 4,735,855 A | 4/1988 | Wofford et al. |
| 4,746,562 A | 5/1988 | Fant |
| 4,755,419 A | 7/1988 | Shah |
| 4,788,105 A | 11/1988 | Mueller et al. |
| 4,857,399 A | 8/1989 | Vicik |
| 4,898,784 A | 2/1990 | Sanders et al. |
| 4,950,513 A | 8/1990 | Mehra |
| 4,997,710 A | 3/1991 | Pockat et al. |
| 5,004,647 A | 4/1991 | Shah |
| 5,006,384 A | 4/1991 | Genske |
| 5,079,059 A | 1/1992 | Wyslotsky |
| 5,167,339 A | 12/1992 | Takata et al. |
| 5,202,192 A | 4/1993 | Hope et al. |
| 5,232,754 A | 8/1993 | Waugh |
| 5,334,272 A | 8/1994 | Takata et al. |
| 5,382,470 A | 1/1995 | Vicik |
| 5,482,770 A | 1/1996 | Bekele |
| 5,512,337 A | 4/1996 | Littmann et al. |

(Continued)

*Primary Examiner*—Alicia Chevalier
(74) *Attorney, Agent, or Firm*—Tom J. Hall (57) ABSTRACT

Coextruded easy-opening film structures having at least three layers for use as a packaging film or as a component thereof suitable for storing and/or cooking food items contained therein. The first film layer includes a material selected from the group consisting of ethylene/α-olefin copolymer, propylene/ethylene copolymer and blends thereof, the second film layer comprises a first modified or unmodified polyolefin and a second modified or unmodified polyolefin which is immiscible in the first modified or unmodified polyolefin; wherein the second layer is disposed between said first layer and said third layer. The third layer includes a material selected from the group consisting of polyethylene, anhydride-modified polyolefin; ethylene/vinyl alcohol copolymer, polyamide and blends thereof. The multilayer coextruded frangible films are thermoformable and exhibit a heat seal strength of between 1000-2500 g/in. (393.7-984.3 g/cm) after being submerged in water at 100° C. for one hour upon conducting a Standard Heat Seal Strength Test.

47 Claims, 2 Drawing Sheets

U.S. PATENT DOCUMENTS

| | | |
|---|---|---|
| 5,695,838 A | 12/1997 | Tanaka et al. |
| 5,707,750 A | 1/1998 | Degrassi et al. |
| 5,741,533 A | 4/1998 | Lorenzo Moore et al. |
| H1727 H | 5/1998 | Jones et al. |
| 5,834,077 A | 11/1998 | Babrowicz |
| 5,837,335 A | 11/1998 | Babrowicz |
| 5,837,358 A | 11/1998 | Bauer et al. |
| 5,891,500 A | 4/1999 | Brodie, III |
| 5,919,547 A | 7/1999 | Kocher et al. |
| 5,925,454 A | 7/1999 | Bekele |
| 5,939,158 A | 8/1999 | Plotzker |
| 5,945,224 A | 8/1999 | Gasse et al. |
| 6,117,464 A | 9/2000 | Moore et al. |
| 6,210,765 B1 | 4/2001 | Tanaka et al. |
| 6,221,410 B1 | 4/2001 | Ramesh et al. |
| RE37,171 E | 5/2001 | Busche et al. |
| 6,274,228 B1 | 8/2001 | Ramesh et al. |
| 6,274,246 B1 | 8/2001 | Eggers et al. |
| 6,299,984 B1 | 10/2001 | Forloni |
| 6,306,472 B1 | 10/2001 | Buelow |
| 6,312,742 B1 * | 11/2001 | Wood et al. ............... 426/122 |
| 6,333,061 B1 | 12/2001 | Vadhar |
| 6,361,843 B1 | 3/2002 | Smith et al. |
| 6,447,892 B1 | 9/2002 | Hatley et al. |
| 6,475,578 B1 | 11/2002 | Gerrits et al. |
| 6,476,137 B1 | 11/2002 | Longo |
| 6,534,137 B1 | 3/2003 | Vadhar |
| 6,555,243 B2 | 4/2003 | Flepp et al. |
| 6,562,443 B1 | 5/2003 | Espinel et al. |
| 6,562,476 B2 | 5/2003 | Shepard et al. |
| 6,599,639 B2 | 7/2003 | Dayrit et al. |
| 6,939,919 B2 * | 9/2005 | Tau et al. .................... 525/191 |
| 2001/0003021 A1 | 6/2001 | Shepherd et al. |
| 2001/0008658 A1 | 7/2001 | Barmore et al. |
| 2002/0015810 A1 | 2/2002 | Piper et al. |
| 2002/0068137 A1 | 6/2002 | Paleari et al. |
| 2002/0119334 A1 | 8/2002 | Shepard et al. |
| 2002/0192446 A1 | 12/2002 | Hatley et al. |
| 2003/0017352 A1 | 1/2003 | Dayrit et al. |
| 2003/0021870 A1 | 1/2003 | Pollok et al. |
| 2003/0152735 A1 | 8/2003 | Koike |

* cited by examiner

FRANGIBLE HEAT-SEALABLE FILMS FOR COOK-IN APPLICATIONS AND PACKAGES MADE THEREOF

BACKGROUND OF THE INVENTION

The present invention is in the field of flexible multilayer packaging films and packages made thereof for "cook-in" packaging applications. More specifically, the present invention relates to flexible multilayer packaging films for "cook-in" packaging which have an "easy-opening" feature.

Food items are often cooked in flexible packaging films by immersing the package in hot water or placing the package in a steam-heated environment. This process is referred to in the art as a "cook-in" process and the film used in the process is known as a "cook-in" film or "cook-in" packaging film. Food items which have been cooked and packaged may then be refrigerated, shipped to a retailer, and stored until the cooked food item is consumed, e.g., sliced and repackaged into smaller portions for consumer display. Alternatively, the cooked food items may be immediately removed from the package and either consumed or sliced and repackaged for consumer display.

Flexible films for cook-in packaging applications must be structurally capable of withstanding exposure to cook-in time and temperature conditions while containing the food item. Cook-in time and temperature conditions typically involve a long, slow cook, for example, submersion in hot water at about 55° C. to 65° C. for about 1 to about 4 hours. Submersion in water or steam at 70° C. to 100° C. for up to 12 hours is also possible.

Often the package forming process for cook-in applications, requires that two film surfaces sealed together by heat sealing around the edges of the package to secure a food item therebetween. The sealing of the two film surfaces is typically done using heated sealing bars or similar equipment. Opening of the package obtained in this way usually requires the use of scissors, knives or other cutting devices. It is often desirable to open a package without the use of scissors or knives. One method which obviates the need for a cutting tool in opening a package is the use a packaging film having an easy-opening feature.

"Easy-open" packaging have been used in a variety of food packaging applications to provide packaging that is easy for the consumer to open without having to tear the packaging. Food packaging having a "easy-open" feature may take several forms. For example, a flexible film lidding or lid stock material may be peelably adhered to a rigid tray, tub, or container. Alternatively, the easy-open packaging may incorporate a frangible or peelable seal between a combination of one or more of flexible films, webs, substrates, or supports. Examples of this alternative include thermoforming and vacuum skin packaging methods known in the art. For example, the lower web or support (e.g., "formed web") may be heated and deep-drawn to form a receptacle for the item to be packaged. Once the item is placed on the support, the upper web (e.g., "non-formed web") is drawn over the item and peelably sealed to the peripheral edges of the support. The seal may be formed using heated sealing bars, platens, or frames to apply heat and pressure to the top and bottom webs in the seal area.

Other types of easy-open packaging may be formed using vertical-form-fill-seal (VFFS) or horizontal-form-fill-seal (HFFS) methods known in the art to form a pouch or bag containing the packaged product. In such alternatives, the frangible film or web may in effect be sealed to itself (i.e., the same type of film material may form both the top and bottom web of the packaging).

Accordingly, it is desirable to develop flexible packaging films which maintain their structural integrity while being exposed to cook-in times and temperature conditions and are also easily opened without the use of ancillary cutting tools. It is also desirable to develop an easy-open or frangible packaging films which are thermoformable for use in storing and cooking food items contained therein.

SUMMARY

The present invention is directed to three-layer frangible coextruded structure for use as a packaging film or as a component thereof suitable for storing and/or cooking food items contained therein. The film layers may be formed from any suitable packaging material, but preferably, the first film layer includes a material selected from the group consisting of ethylene/α-olefin copolymer, propylene/ethylene copolymer or blends thereof.

Preferably, the ethylene/α-olefin copolymer of the first layer has a melting point of less than 105° C. as measured in accordance with ASTM D-3418, a molecular weight distribution $M_w/M_n$ of from 0.05-2.7 as measured in accordance with ASTM D-3593-80, and a melt index of from 5.0-34 g/10 min. at 190° C. as measured in accordance with ASTM D-1238 Condition 190° C./2.16 kg.

Preferably, the first layer serves as a heat-sealable, outer-film layer of the multilayer film.

Preferably, the first layer is free of polybutylene or polybutene.

The second film layer is preferably positioned between the first film layer and the third film layer may be formed from any suitable packaging material, but preferably includes a first blend component selected from the group consisting of polypropylene, polybutene, and blends thereof, and the first blend component is incompatible with a second blend component. The second blend component comprises a material selected from the group consisting of ethylene/α-olefin, propylene/ethylene, ethylene/vinyl acetate copolymer, polyethylene, anhydride-modified polyolefin, ionomer, anhydride-modified ethylene/vinyl acetate copolymer, ethylene/methyl acrylate copolymer, ethylene/ethyl acrylate copolymer, anhydride-modified ethylene/α-olefin copolymer, or blends thereof.

The third film layer may also comprise any suitable packaging material, but preferably includes a polymer selected from the group consisting of polyethylene, anhydride-modified polyolefin; ethylene/vinyl alcohol copolymer, polyamide and blends thereof.

Preferably, the anhydride-modified polyolefin of the second and third film layers comprise a maleic anhydride-grafted copolymer of between 0.05-1% by weight of maleic anhydride and between 99.95-99% by weight of polyolefin relative to the total weight of the anhydride-modified polyolefin.

Preferably, the three-layer embodiment of the present invention may be thermoformable.

Preferably, the three-layer embodiment of the present invention is adapted to serve as a frangible packaging film or as a component thereof for use in cook-in applications.

Another embodiment of the present invention includes a four-layer frangible coextruded structure for use as a packaging film or as a component thereof suitable for storing and/or cooking food items contained therein. In this embodiment, the film layers may be formed from any suitable packaging material, but preferably, include the same materials as the three-layer embodiment described hereinabove.

The fourth layer of the four-layer embodiment may include any suitable packaging material, but preferably comprises a material selected from the group consisting of ethylene/vinyl alcohol copolymer, polyamide, polyethylene, anhydride-modified polyolefin or blends thereof.

Preferably, the four-layer embodiment of the present invention may be thermoformable.

Preferably, the four-layer embodiment of the present invention adapted to serve as a frangible packaging film or as a component thereof for use in cook-in applications.

Still another embodiment of the present invention includes a seven-layer frangible coextruded structure for use as a packaging film or as a component thereof suitable for storing and/or cooking food items contained therein. The film layers for a seven-layer embodiment may comprise any suitable packaging material, but preferably, include the materials as the four-layer embodiment described hereinabove.

The fifth layer of the seven-layer may comprises a material selected from the group consisting of polyethylene, polybutene, anhydride-modified polyolefin, or blends thereof.

Preferably, the five-layer structure may be thermoformable.

Preferably, the seven-layer embodiment of the present invention may be thermoformable.

Preferably, the seven-layer embodiment of the present invention adapted to serve as a frangible packaging film or as a component thereof for use in cook-in applications.

Preferably, the multilayer coextruded frangible films in accordance with the present invention exhibit a heat seal strength of between 1000-2500 g/inch (393.7-984.3 g/cm) after being submerged in water at 100° C. for one hour on conducting a Standard Heat Seal Strength Test.

Preferably, the inventive films have a unrestrained linear thermal shrinkage in the machine direction or the transverse direction of less than 5% at 100° C. as measured in accordance with ASTM D-2732 test method. In addition, the present invention provides films which have an oxygen transmission rate of from about 0.01-1.00 cm$^3$/100 in.$^2$ (0.1550-15.50 cm$^3$/m$^2$) as measured in accordance with ASTM D-3985-81 test method.

DETAILED DESCRIPTION OF THE INVENTION

As used herein, the term "polymer" refers to the product of a polymerization reaction, and is inclusive of homopolymers, copolymers, terpolymers, etc. In general, the layers of a film can consist essentially of a single polymer, or can have still additional polymers together therewith, i.e., blended therewith.

As used herein, the term "copolymer" refers to polymers formed by the polymerization of reaction of at least two different monomers. For example, the term "copolymer" includes the co-polymerization reaction product of ethylene and an α-olefin, such as 1-hexene. The term "copolymer" is also inclusive of, for example, the co-polymerization of a mixture of ethylene, propylene, 1-propene, 1-butene, 1-hexene, and 1-octene. As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer.

As used herein, terminology employing a "/" with respect to the chemical identity of a copolymer (e.g. "propylene/ethylene copolymer" or "ethylene/α-olefin"), identifies the comonomers which are copolymerized to produce the copolymer.

As used herein, the term "frangible" refers to peelable films which may be opened by manually pulling apart the film structure at a designated position on the package, e.g., starting from a corner or an edge of the package where the two film surfaces have purposely not been heat sealed together and pulling one film across the other or by grabbing the film surface on opposite sides of the package and pulling in opposite directions. In either example, one or more film layers are ruptured or torn when the force used to pull apart the film exceeds the heat seal strength of the film. The heat seal strength, i.e., the strength needed to keep two adjacent layers bonded together, in a flexible packaging film may be predetermined by the selection of the composition of one or more film layers.

As used herein, the term "heat-sealable" refers to any layer of a multilayered film where the layer is involved in the sealing of the film to itself, another film layer of the same or another film, and/or another article which is not a film. The heat-sealable layer of the present invention is capable of fusion bonding by conventional indirect means which generate sufficient heat on at least one film contact surface for conduction to the contiguous film contact surface and formation of a bond interface therebetween without loss of the film integrity. Advantageously, the bond interface must be sufficiently thermally stable to prevent gas or liquid leakage therethough.

As used herein, the term "thermoformable" refers to films which are capable of being formed into a desired shape upon the application of heat, and are thermoformed about the product on a support member by means of heat and differential pressure. Virtually all of the air is evacuated from the interior of the package so that the film conforms very closely to the contour of the packaged product. Generally, sufficient heat is applied to cause the film to bond with the support member outside the periphery of the product, either by employing a heat-activatable adhesive at the interface of the film and support member or by forming the film and support member from materials that are otherwise sealingly compatible upon the application of heat, e.g., by employing similar polymeric materials, such as polyethylenes, at the seal interface that bond to one another when heated. Alternatively, a pressure-sensitive adhesive can be used.

As used herein, the phrase "outer-film layer" refers to any film layer of a multilayer film having less than two of its principal surfaces directly adhered to another layer of the film.

As used herein, the phrase "oxygen transmission rate" refers to the rate of oxygen gas passing through an entire film structure. For perishable food packaging applications, the oxygen ($O_2$) transmission rates desirably should be minimized. Typical films are required to have an $O_2$ transmission rates of less than about 20 cm$^3$/m$^2$ for a 24 hour period at 1 atmosphere, 0% relative humidity and 23° C., preferably less than 15 cm$^3$/m$^2$, more preferably less than 10 cm$^3$/m$^2$. Oxygen transmission may be measured according to ASTM D-3985-81 which is incorporated herein by reference. This requirement may be satisfied by numerous well-known oxygen barrier materials in at least one layer of a film, for example, ethylene/vinyl alcohol copolymer, polyvinyl chloride, polyvinylidene chloride, polyamide, polyester, polyacrylonitrile, copolymers of vinylidene chloride and vinyl chloride or alkyl acrylate, or a blend thereof.

As used herein, the term "anhydride-modified" refers to any form of anhydride functionality, such as the anhydride of maleic acid, fumaric acid, etc., whether co-polymerized with an anhydride-containing monomer with a second, different monomer, grafted onto a polymer or copolymer, or blended with one or more polymers, and is inclusive of derivatives of such functionalities, such as acids, esters, and metal salts derived therefrom. In accordance with the present invention, examples of suitable anhydride-modified materials include, but are not limited to anhydride-modified ethylene/vinyl acetate copolymer, anhydride-modified ethylene/α-olefin copolymer, anhydride-modified polyolefin, preferably, an anhydride-modified polyolefin copolymer comprising between 0.05-1% by weight of maleic anhydride and between 99.95-99% by weight of polyolefin relative to the total weight of said anhydride-modified polyolefin.

The multilayered films of the present invention may be made by any suitable and known film-making process, e.g., cast or blown through either an annular or flat die, and is preferably fully coextruded. As used herein, the term "coextruded" refers to the process of extruding two or more materials through a single die with two or more orifices arranged so that the extrudates merge and weld together into a laminar structure before chilling and solidifying. The film of the present invention may be generally prepared from dry resins which are melted in an extruder and passed trough a die to form the primary film material, most commonly in a tube form. The well-known two step "double bubble" or trapped bubble process may be used to prepare the packaging films of the present invention.

One embodiment of the double bubble process is described in U.S. Pat. No. 3,456,044 to Pahlke, which is incorporated herein by reference. In the Pahlke-type double bubble process a primary tube is extruded, cooled, reheated and the tube is simultaneously stretched in the machine direction by operating longitudinally spaced nip rolls at different speeds, and in the transverse direction by inflating air inside the tube. Suitable stretch ratios are from about 2 to about 6 with ratios of about 3 to about 5 preferred. In the multilayered films of the present invention, all layers were simultaneously coextruded, cooled via water, chilled metal roll, or air quenching, and then reheated for biaxial orientation.

Unless otherwise noted, the resins utilized in the present invention are generally commercially available in pellet form and, as generally recognized in the art, may be melt blended or mechanically mixed by well-known methods using commercially available equipment including tumblers, mixers or blenders. Also, if desired, well known additives such as processing aids, slip agents, anti-blocking agents and pigments, and mixtures thereof may be incorporated into the film, by blending prior to extrusion. The resins and any additives are introduced to an extruder where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other processing parameters chosen.

In the practice of this invention, it may be desirable to irradiated the entire film to cause crosslinking of at least one layer of the film to improve the abuse and/or puncture resistance and other physical characteristics of the film. Crosslinking is the predominant reaction which occurs on irradiation of many polymers and results in the formation of carbon-carbon bonds between polymer chains. Crosslinking may be accomplished, for example, by irradiation using high energy electrons, gamma-rays, beta particles and the like. The irradiation source can be any electron beam generator operating in a range of about 150 kilovolts to about 6 megavolts with a power output capable of supplying the desired dosage. The voltage can be adjusted to appropriate levels which may be for example 1 to 6 million volts or higher or lower. Many apparatus for irradiating films are known to those skilled in the art. The most preferred amount of radiation is dependent upon the film and its end use.

Preferably, the heat-shrinkable, coextruded multilayered packaging film of the present invention can have any total film thickness desired, typical thicknesses may range between 1-10 mils, preferably 2-6 mils, most preferably 3-5 mils.

As used herein, the term "cook-in" refers to packaging material structurally capable of withstanding exposure to cook-in time-temperature conditions while containing a food product. Cook-in packaged foods are essentially prepackaged, precooked foods that go directly to the consumer in that configuration which may be consumed with or without warming. Cook-in time-temperature conditions typically refer to a long slow cook, for example submerging in water at 70°-80° C. for four to six hours. Such cook-in time-temperature requirements are representative of institutional cooking requirements. Submerging at 80° C. for twelve hours probably represents the limiting case. Under such conditions, a packaging material properly characterized as cook-in will maintain seal integrity and will be resistant to delamination.

As used herein, the phrase "heat seal strength" refers to the force required to pull a heat-seal apart. Heat seal strength can be controlled by the composition of one or more layers forming the multilayer coextruded frangible film according to the present invention.

Standard Heat Seal Strength Test

A standard test to determine the heat seal strength of the inventive films is ASTM F-88-94 which has the following method modifications. A first modification of ASTM F-88-94 includes the film under test being heat sealed to a second, structurally different film, as opposed to the film under test being heat sealed to itself or structurally similar film. This modification includes a second film having a first, outer-film, heat-sealable layer of ethylene/vinyl acetate having a 5% (by weight) vinyl acetate content, a second layer of polyurethane, and a third layer of biaxially-oriented polyethylene terephthalate having a coating (0.5 mil) of polyvinylidene chloride. A second modification to ASTM F-88-94 consists of allowing the end of the strip of film under test to hang freely from the Tensile Tester unit. These modifications to ASTM F-88-94 afford accurate and reproducible determination of heat seal strength for coextruded and/or laminated films which are designed to be peeled apart with light force after being sealed at conditions of 149° C. (300° F.), 30 psi, and 1 second dwell.

As used herein, the term "polyolefin" refers to homopolymers, copolymers, including e.g. bipolymers, terpolymers, etc., having a methylene linkage between monomer units which may be formed by any method known to those skill in the art. Suitable examples of polyethylene include low-density polyethylene, medium-density polyethylene, high-density polyethylene, polyethylenes comprising copolymers of ethylene with one or more α-olefins such as butene-1, hexene-1, octene-1, or the like as a comonomer, linear low-density polyethylene, very low-density polyethylene, ultra low-density polyethylene, ethylene/propylene copolymers, polypropylene, propylene/ethylene copolymer, polyisoprene, polybutylene, polybutene, poly-3-methylbutene-1, poly-4-methylpentene-1, ionomers and the like. In accordance with the present invention, one or more layers of the multilayer film may include polyolefin.

As used herein, the term "polybutene" refers to a family of butylene homopolymers and copolymers which include polybutene, polybutene-1, polybutene-2, polybutylene, polyisobutylene, and the like.

As used herein, the term "ethylene/α-olefin" refer to a copolymer produced by the co-polymerization of ethylene and any one or more α-olefin. The α-olefin in the present invention has between 3-20 pendant carbon atoms, preferably, 3-12 pendant carbon atoms and more preferably, 3-6 pendant carbon atoms. The co-polymerization of ethylene and an α-olefin may be produced by heterogeneous catalysis, i.e., co-polymerization reactions with Ziegler-Natta catalysis systems, for example, metal halides activated by an organometallic catalyst, i.e., titanium chloride, optionally containing magnesium chloride, complexed to trialkyl aluminum and may be found in patents such as U.S. Pat. No. 4,302,565 to Goeke, et al. and U.S. Pat. No. 4,302,566 to Karol, et al., both of which are hereby incorporated, in their entireties, by reference thereto. Heterogeneous catalyzed copolymers of ethylene and an α-olefin may include linear low density polyethylene, very low density polyethylene and ultra low density polyethylene. These copolymers of this type are available from, for example, The Dow Chemical Company, of Midland, Mich., U.S.A. and sold under the trademark Dolex™ resins.

Additionally, ethylene/α-olefin copolymers may also be produced by homogeneous catalysis, for example, co-polymerization reactions with metallocene catalysis systems which include constrained geometry catalysts, i.e., monocyclopentadienyl transition-metal complexes taught in U.S. Pat. No. 5,026,798, to Canich, the teachings of which are incorporated herein by reference. Homogeneous catalyzed may include long-chain branched (8-20 pendant carbons atoms) α-olefin copolymers available from The Dow Chemical Company, known as Affinity™ and Attane™ resins, Tafmer™ linear copolymers obtainable from the Mitsui Petrochemical Corporation of Tokyo, Japan and short-chain branched (3-6 pendant carbons atoms) α-olefin copolymers known as Exact™ resins obtainable from ExxonMobil Chemical Company of Houston, Tex., U.S.A. In accordance with the present invention, one or more layers may include an ethylene/α-olefin copolymer having a long-chain branch (8-20 pendant carbons atoms) α-olefin comonomer.

In general, homogeneous catalyzed ethylene/α-olefin copolymers may be characterized by one or more methods known to those of skill in the art, such as molecular weight distribution ($M_w/M_n$), composition distribution breadth index (CDBI), narrow melting point range, and single melt point behavior. The molecular weight distribution ($M_w/M_n$), also known as "polydispersity," can be determined by gel permeation chromatography (GPC) where $M_w$ is defined as the weight-average molecular weight and $M_n$ is defined as the number-average molecular weight. The molecular weight determination of polymers and copolymers can be measured as outlined in ASTM D-3593-80, which is incorporated herein in its entirety by reference. Ethylene/α-olefin copolymers of the present invention can be homogeneous catalyzed copolymers of ethylene and an α-olefin which may have a $M_w/M_n$ of less than 2.7, more preferably from about 1.9 to 2.5; still more preferably, from about 1.9 to 2.3. The composition distribution breadth index (CDBI) of the homogeneous catalyzed copolymers of ethylene and an α-olefin will generally be greater than about 70%. This is contrasted with heterogeneous catalyzed copolymers of ethylene and an α-olefin which may have a broad composition distribution index of generally less than 55%. The CDBI is defined as the weight percent of the copolymer molecules having a comonomer content within 50 percent (i.e., plus or minus 50%) of the median total molar comonomer content. The Composition Distribution Breadth Index (CDBI) may be determined via the technique of Temperature Rising Elution Fractionation (TREF) as described by Wild, et al., *Journal of Polymer Science, Poly. Phys Ed.*, Vol. 20, p. 441 (1982) and U.S. Pat. No. 4,798,081, which are both incorporated herein, in their entireties, by reference. In accordance with the present invention, the first layer may include an ethylene/α-olefin copolymer having a molecular weight distribution ($M_w/M_n$) of from 0.05-2.7 as determined by method described by ASTM D-3593-80.

In general, homogeneous catalyzed ethylene/α-olefin copolymers exhibit an essentially singular melting point characteristic, with a melting point ($T_m$), determined by Differential Scanning Calorimetry (DSC). As used herein, "essentially singular melting point" means that at least about 80%, by weight, of the material corresponds to a single $T_m$ peak. DSC measurements may be made on a Perkin Elmer System 7 Thermal Analysis System according to ASTM D-3418, which is hereby incorporated, in its entirety, by reference thereto. In accordance with the present invention, the first layer of the multilayer frangible film may include an ethylene/α-olefin copolymer having a melting point less than 125° C., preferably, less than 110° C., and most preferably, less than 105° C. as measured in accordance with ASTM D-3418 test method.

As used herein, the phrase "ethylene/vinyl alcohol copolymer", refers to polymerized ethylene vinyl alcohol. Ethylene/vinyl alcohol copolymers include saponified or hydrolyzed ethylene/vinyl acetate copolymers, and refers to a vinyl alcohol copolymer having an ethylene comonomer, and prepared by, for example, hydrolysis of vinyl acetate copolymers or by chemical reactions with vinyl alcohol. The degree of hydrolysis is preferably at least 50%, and more preferably, at least 85%. Preferably, ethylene/vinyl alcohol copolymers comprise from about 28-48 mole % ethylene, more preferably, from about 32-44 mole % ethylene, and even more preferably, from about 38-44 mole % ethylene.

As used herein, the term "polyamide" refers to homopolymers, copolymers, or terpolymers having an amide linkage between monomer units which may be formed by any method known to those skill in the art. Useful polyamide homopolymers include poly(4-aminobutyric acid) (nylon 4), poly(6-aminohexanoic acid) (nylon 6, also known as poly (caprolactam)), poly(7-aminoheptanoic acid) (nylon 7), poly (8-aminooctanoic acid)(nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), as well as nylon 46, nylon 66 and nylon 69 and the like. Useful aliphatic polyamide copolymers include poly(hexamethylene adipamide) (nylon 6,6), poly(hexamethylene sebacamide) (nylon 6,10), poly (heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6), poly(tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12), as well as copolymers thereof and as well as other nylons which are not particularly delineated here. Exemplary of aliphatic/aromatic polyamides include poly(tetramethylenediamine-co-isophthalic acid) (nylon 4,I), polyhexamethylene isophthalamide (nylon 6,I), hexamethylene adipamide/hexamethylene-isophthalamide (nylon 6,6/6I), hexamethylene adipamide/hexamethyleneterephthalamide (nylon 6,6/6T), poly(2,2,2-trimethyl hexamethylene terephthalamide), poly(m-xylylene adipamide) (MXD6), poly(p-xylylene adipamide), poly(hexamethylene terephthalamide), poly(dodecamethylene terephthalamide), polyamide 6T/6I, polyamide 6/MXDT/I, polyamide MXDI, and the like. Blends of two or more aliphatic/aromatic polyamides may also be used. Aliphatic/aromatic polyamides may be prepared by known preparative techniques or may be obtained from commercial sources.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout.

Figure 1:
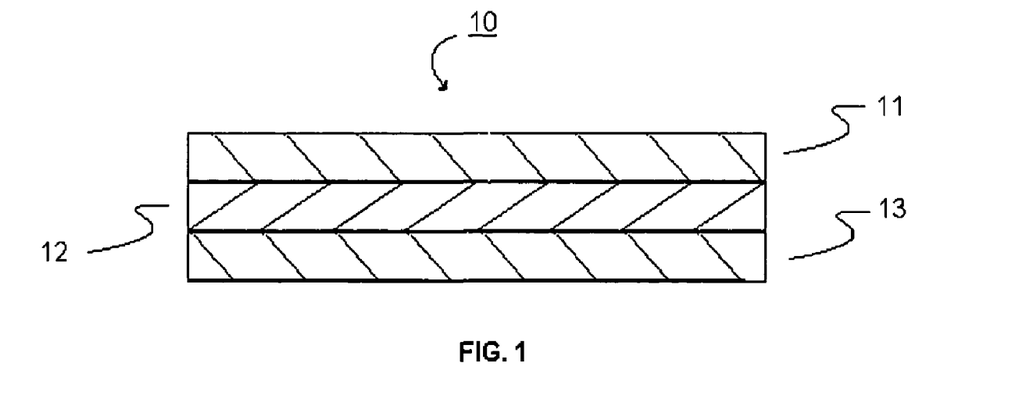
FIG. 1 is a cross-sectional view of one example a multilayered film having three layers according to the present invention.

Referring now to FIG. 1, film 10 represents one example of a three-layer embodiment of the present invention. Film 10 is depicted having a first layer 11, a second layer 12 is positioned between first layer 11 and a third layer 13. First layer 11, second 12 and third layer 13 each comprise materials as outlined hereinabove.

Figure 2:
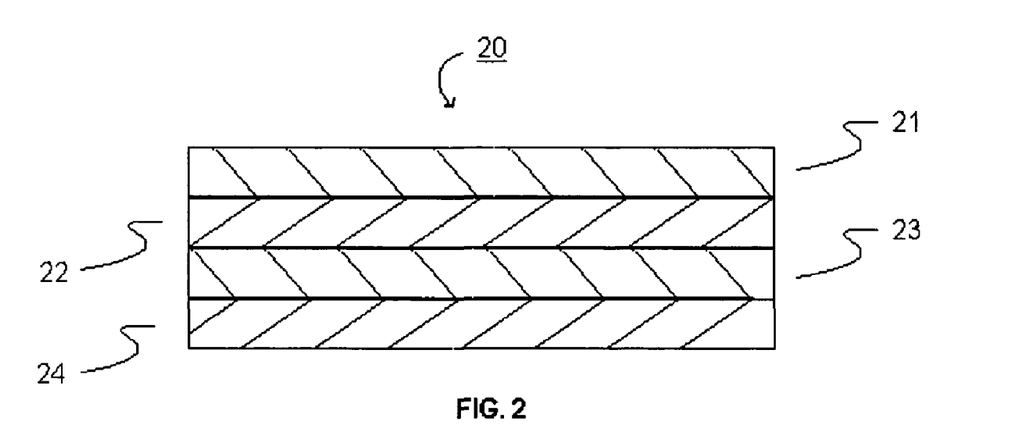
FIG. 2 is a cross-sectional view of one example a multilayered film having four layers according to the present invention.

Referring now to FIG. 2, film 20 represents one example of a four-layer embodiment of the present invention. Film 20 is depicted having a first layer 11, a second layer 12 is positioned between first layer 11, a third layer 13 and a fourth layer 14. First layer 11, second 12, third layer 13, and fourth layer 14 each comprise materials as outlined hereinabove.

Figure 3:
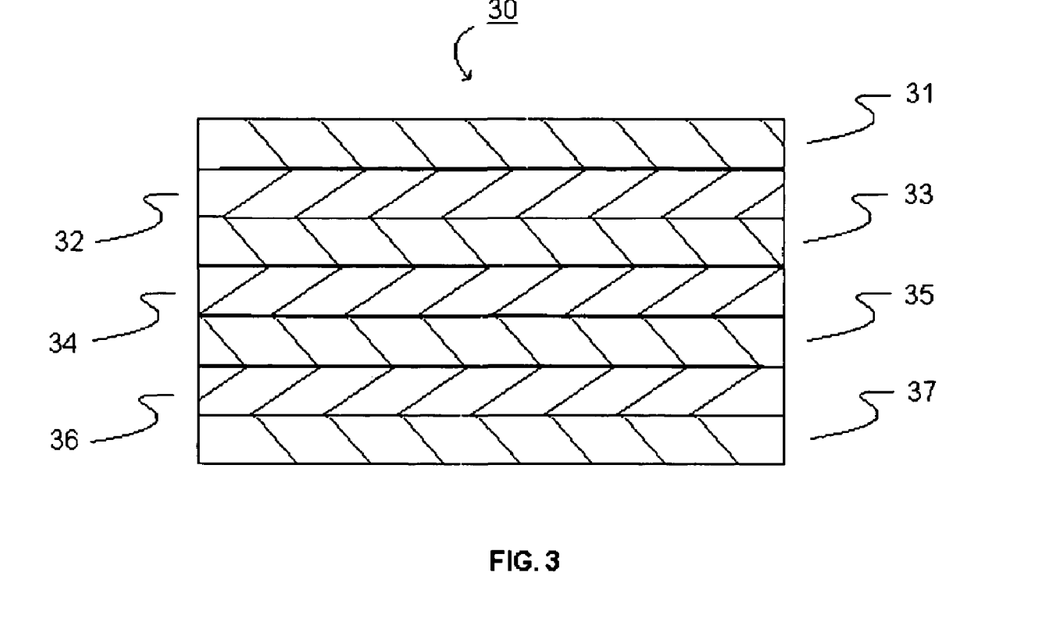
FIG. 3 is a cross-sectional view of one example a multilayered film having seven layers according to the present invention.

Referring now to FIG. 3, film 30 represents one example of a seven-layer embodiment of the present invention. Film 30 is depicted having a first layer 31, a second layer 32 is positioned between first layer 31, a third layer 33, a fourth layer 34, a fifth layer 35, a sixth layer 36, and a seventh layer 37. First layer 31, second 32, third layer 33, fourth layer 34, fifth layer 35, sixth layer 36, and seventh layer 37 each comprise materials as outlined hereinabove.

EXAMPLES

Example 1

Table 1, below is illustrative of a three-layer coextruded film according to the present invention. Table 1 provides the details the identity of the various materials present in each of the film layers, the arrangement of each of the film layers, the relative proportions of each of the materials in each of the film layers, and the thickness of each of the film layers.

TABLE 1

| Film Layer | Material Proportions | Thickness |
| --- | --- | --- |
| First | 87.7% Ethylene/α-olefin copolymer-1<br>12.30% Additives | 4.1% |
| Second | 30.00% Ethylene/α-olefin copolymer-2<br>10.00% Polybutene copolymer<br>55.00% Ethylene/vinyl acetate copolymer-1<br>5.00% Additives | 8.9% |
| Third | 100% Anhydride-modified polyolefin-1 | 16.5% |

In Table 1 above:

Ethylene/α-olefin copolymer-1 was Exact™ 3139 ethylene/α-olefin copolymer having a density of 0.900 g/cm$^3$, a melt index of 7.5 g/10 min., and a melting point of 95° C. obtained from ExxonMobil Chemical Company of Houston, Tex., U.S.A.

Ethylene/α-olefin copolymer-2 was Affinity PL 1850 having a density of 0.902 g/cm$^3$, a melt index of 3.0 g/10 min., and a melting point of 98° C. obtained from The Dow Chemical Company, Midland, Mich., U.S.A.

Polybutene copolymer was a polybutene-1 grade PB 8640 having a density of 0.908 g/cm$^3$, a melt index of 1.0 g/10 min., and a melting point of 117.2° C. obtained from Basell North America, Inc., Elkton, Md., U.S.A.

Ethylene/vinyl acetate copolymer-1 was Elvax® 3135XZ having 12% vinyl acetate content, a density of 0.93 g/cm$^3$, a melt index of 0.35 g/10 min., and a melting point of 96° C. obtained from E.I. de Pont de Nemours and Company, Wilmington, Del., U.S.A.

Anhydride-modified polyolefin-1 was Bynel® 41E712 having a melt index of 1.5 g/10 min., and a melting point of 125° C. obtained from E.I. de Pont de Nemours and Company, Wilmington, Del., U.S.A.

Example 2

Table 2, below is illustrative of a four-layer coextruded film according to the present invention. Table 2 provides the details the identity of the various materials present in each of the film layers, the arrangement of each of the film layers, the relative proportions of each of the materials in each of the film layers, and the thickness of each of the film layers.

TABLE 2

| Film Layer | Material Proportions | Thickness |
|---|---|---|
| First | 87.7% Ethylene/α-olefin copolymer-1<br>12.30% Additives | 4.1% |
| Second | 30.00% Anhydride-modified polyolefin-2<br>10.00% Polybutene copolymer<br>55.00% Ethylene/vinyl acetate copolymer-2<br>5.00% Additives | 8.9% |
| Third | 100.00% Ethylene/vinyl alcohol copolymer | 16.5% |
| Fourth | 100.00% Anhydride-modified polyolefin-1 | 10.4% |

In Table 2 above:

Ethylene/α-olefin copolymer-1 was the same as described above in Table 1.

Anhydride-modified polyolefin-2 was Plexar® PX 3227 having a density of 0.913 g/cm³, and a melt index of 1.7 g/10 min., obtained from Equistar Chemicals, LP, Houston, Tex., U.S.A.

Polybutene copolymer was the same as described above in Table 1.

Ethylene/vinyl acetate copolymer-2 was Escorene™ Ultra LD 705 having a density of 0.935 g/cm³, a melt index of 0.4 g/10 min., and a melting point of 92° C. obtained from ExxonMobil Chemical Company of Houston, Tex., U.S.A.

Ethylene/vinyl alcohol copolymer was Soarnol® ET3803 having a density of 1.17 g/cm³, a melt index of 3.2 g/10 min., and a melting point of 172° C., obtained from Soarus, LLC, Arlington Heights, Ill., U.S.A.

Anhydride-modified polyolefin-1 was the same as described above in Table 1.

Example 3

Table 3, below is illustrative of a seven-layer coextruded film according to the present invention. Table 3 provides the details the identity of the various materials present in each of the film layers, the arrangement of each of the film layers, the relative proportions of each of the materials in each of the film layers, and the thickness of each of the film layers.

TABLE 3

| Film Layer | Material Proportions | Thickness |
|---|---|---|
| First | 87.7% Ethylene/α-olefin copolymer-1<br>12.30% Additives | 4.1% |
| Second | 30.00% Ethylene/α-olefin copolymer-2<br>10.00% Polybutene copolymer<br>55.00% Ethylene/vinyl acetate copolymer-2<br>5.00% Additives | 8.9% |
| Third | 100% Anhydride-modified polyolefin-2 | 16.5% |
| Fourth | 100.00% Ethylene/vinyl alcohol copolymer | 10.4% |
| Fifth | 100.00% Anhydride-modified polyolefin-2 | 4.9% |
| Sixth | 74.10% Ethylene/α-olefin copolymer-3<br>25.00% Polyethylene<br>0.90% Additives | 18.2% |
| Seventh | 74.10% Ethylene/α-olefin copolymer-3<br>25.00% Polyethylene<br>0.90% Additives | 37.1% |

In Table 3 above:

Ethylene/α-olefin copolymer-1 was the same as described above in Table 1.

Ethylene/α-olefin copolymer-2 was the same as described above in Table 1.

Polybutene copolymer was the same as described above in Table 1.

Ethylene/vinyl acetate copolymer-2 was the same as described above in Table 2.

Anhydride-modified polyolefin-2 was the same as described above in Table 2.

Ethylene/α-olefin copolymer-3 was Attane™ 4201 having a density of 0.912 g/cm³, a melt index of 1.0 g/10 min., and a melting point of 123° C., obtained from The Dow Chemical Company, Midland, Mich., U.S.A.

Polyethylene was LL 1001 having a density of 0.918 g/cm³, a melt index of 1.0 g/10 min., and a melting point of 120° C., obtained from ExxonMobil Chemical Company of Houston, Tex., U.S.A.

Unless otherwise noted, the physical properties and performance characteristics reported herein were measured by test procedures similar to the following methods. All ASTM test methods listed below are hereby incorporated thereto, in their respective entireties.

| | |
|---|---|
| Density | ASTM D-1505 |
| Unrestrained Linear Thermal Shrinkage | ASTM D-2732-96 |
| Molecular Weight | ASTM D-3593-80 |
| Melting Point | ASTM D-3418 |
| Melt Index | ASTM D-1238 |
| Oxygen Transmission Rate | ASTM D-3985-81 |
| Heat Seal Strength | ASTM F-88-94 |

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A multilayer coextruded frangible film for cook-in applications comprising;
   (a) a first layer, a second layer, and a third layer;
   (b) wherein said first layer comprises a material selected from the group consisting of ethylene/α-olefin copolymer, propylene/ethylene copolymer and blends thereof;
   (c) wherein said second layer comprises a first modified or unmodified polyolefin and a second modified or unmodified polyolefin which is immiscible in said first modified or unmodified polyolefin; wherein said second layer is disposed between said first layer and said third layer;

(d) wherein said third layer comprises a material selected from the group consisting of polyethylene, anhydride-modified polyolefin, ethylene/vinyl alcohol copolymer, polyamide and blends thereof; and (e) wherein said second layer is adapted to peel from said first layer or said third layer under a force of between 1000-2500 g/in. (393.7-984.3 g/cm) as measured in accordance with the Standard Heat Seal Strength Test.

2. A multilayer coextruded frangible film according to claim 1, wherein said first layer is free of polybutene copolymer and is a heat-sealable, outer-film layer.

3. A multilayer coextruded frangible film for cook-in applications comprising;

(a) a first layer, a second layer, and a third layer;

(b) wherein said first layer comprises a material selected from the group consisting of ethylene/α-olefin copolymer, propylene/ethylene copolymer and blends thereof;

(c) wherein said second layer comprises a first blend component; said first blend component comprises a material selected from the group consisting of polypropylene, polybutene copolymer, and blends thereof and said first blend component is immiscible with a second blend component; said second blend component comprises a material selected from the group consisting of ethylene/α-olefin copolymer, propylene/ethylene copolymer, ethylene/vinyl acetate copolymer, polyethylene, anhydride-modified polyolefin, ionomer, anhydride-modified ethylene/vinyl acetate copolymer, ethylene/methyl acrylate copolymer, ethylene/ethyl acrylate copolymer, anhydride-modified ethylene/α-olefin copolymer, and blends thereof; wherein said second layer is disposed between said first layer and said third layer;

(d) wherein said third layer comprises a material selected from the group consisting of polyethylene, anhydride-modified polyolefin, ethylene/vinyl alcohol copolymer, polyamide and blends thereof; and (e) wherein said second layer is adapted to peel from said first layer or said third layer under a force of between 1000-2500 g/in. (393.7-984.3 g/cm) as measured in accordance with the Standard Heat Seal Strength Test.

4. A multilayer coextruded frangible film according to claim 3, wherein said first layer is free of polybutene copolymer and is a heat-sealable, outer-film layer.

5. A multilayer coextruded frangible film according to claim 3, wherein said ethylene/α-olefin copolymer of said first layer has a melting point of less than 105° C. as measured in accordance with ASTM D-3418, a molecular weight distribution $M_w/M_n$ of from 0.05-2.7 as measured in accordance with ASTM D-3593-80, and a melt index of from 5.0-34 g/10 min. at 190° C. as measured in accordance with ASTM D-1238 Condition 190° C./2.16 kg.

6. A multilayer coextruded frangible film according to claim 3, wherein said anhydride-modified polyolefin comprises a maleic anhydride-grafted copolymer of between 0.05-1% by weight of maleic anhydride and between 99.95-99% by weight of polyolefin relative to the total weight of said anhydride-modified polyolefin.

7. A multilayer coextruded frangible film according to claim 3, wherein said film has an unrestrained linear thermal shrinkage in the machine direction or the transverse direction of less than 5% at 100° C. as measured in accordance with ASTM D-2732 test method.

8. A multilayer coextruded frangible film according to claim 3, wherein said film has an oxygen transmission rate of from about 0.01-1.00 $cm^3$/100 $in.^2$ (0.1550-15.50 $cm^3$/$m^2$) as measured in accordance with ASTM D-3985-81 test method.

9. A multilayer coextruded frangible film according to claim 3, wherein said film is thermoformable.

10. A multilayer coextruded frangible film according to claim 3, further comprising a fourth layer; wherein said fourth layer comprises a material selected from the group consisting of ethylene/vinyl alcohol copolymer, polyamide, polyethylene, anhydride-modified polyolefin and blends thereof.

11. A multilayer coextruded frangible film according to claim 10, wherein said film is thermoformable.

12. A multilayer coextruded frangible film according to claim 10, further comprising a fifth layer; wherein said fifth layer comprises a material selected from the group consisting of polyethylene, polybutene copolymer, anhydride-modified polyolefin, and blends thereof.

13. A multilayer coextruded frangible film according to claim 12, wherein said film is thermoformable.

14. A multilayer coextruded frangible film according to claim 12, further comprising a sixth layer; wherein said sixth layer comprises an ethylene/α-olefin copolymer.

15. A multilayer coextruded frangible film according to claim 14, further comprising a seventh layer; wherein said seventh layer comprises an ethylene/α-olefin copolymer.

16. A multilayer coextruded frangible film according to claim 15, wherein said film is thermoformable.

17. A multilayer coextruded frangible film according to claims 1, 3, 10, 12, or 15, wherein said film forms a package adapted for storing and cooking food items.

18. A multilayer coextruded frangible film according to claim 17, wherein said first layer of said film is heat sealed to itself to form said package.

19. A multilayer coextruded frangible film according to claim 17, wherein said first layer of said film is heat sealed to a second film to form said package.

20. A multilayer coextruded frangible film according to claim 19, wherein said second film is thermoformable.

21. A multilayer coextruded frangible film for cook-in applications comprising;

(a) a first layer, a second layer, a third layer, and a fourth layer;

(b) wherein said first layer comprises a material selected from the group consisting of ethylene/α-olefin copolymer, propylene/ethylene copolymer and blends thereof;

(c) wherein said second layer comprises a first blend component; said first blend component comprises a material selected from the group consisting of polypropylene, polybutene copolymer, and blends thereof and said first blend component is immiscible with a second blend component, said second blend component comprises a material selected from the group consisting of ethylene/α-olefin copolymer, propylene/ethylene copolymer, ethylene/vinyl acetate copolymer, polyethylene, anhydride-modified polyolefin, ionomer, anhydride-modified ethylene/vinyl acetate copolymer, ethylene/methyl acrylate copolymer, ethylene/ethyl acrylate copolymer, anhydride-modified ethylene/α-olefin copolymer, and blends thereof; wherein said second layer is disposed between said first layer and said third layer;

(d) wherein said third layer comprises a material selected from the group consisting of polyethylene, anhydride-modified polyolefin, ethylene/vinyl alcohol copolymer, polyamide and blends thereof;

(e) wherein said fourth layer comprises a material selected from the group consisting of ethylene/vinyl alcohol copolymer, polyamide, polyethylene, anhydride-modified polyolefin and blends thereof; and (f) wherein said second layer is adapted to peel from said first layer or said third layer under a force of between 1000-2500 g/in. (393.7-984.3 g/cm) as measured in accordance with the Standard Heat Seal Strength Test.

22. A multilayer coextruded frangible film according to claim 21, wherein said first layer is free of polybutene copolymer and is a heat-sealable, outer-film layer.

23. A multilayer coextruded frangible film according to claim 21, wherein said ethylene/α-olefin copolymer of said first layer has a melting point of less than 105° C. as measured in accordance with ASTM D-3418, a molecular weight distribution $M_w/M_n$ of from 0.05-2.7 as measured in accordance with ASTM D-3593-80, and a melt index of from 5.0-34 g/10 min. at 190° C. as measured in accordance with ASTM D-1238 Condition 190° C./2.16 kg.

24. A multilayer coextruded frangible film according to claim 21, wherein said film is thermoformable.

25. A multilayer coextruded frangible film according to claim 21, wherein said anhydride-modified polyolefin comprises a maleic anhydride-grafted copolymer of between 0.05-1% by weight of maleic anhydride and between 99.95-99% by weight of polyolefin relative to the total weight of said anhydride-modified polyolefin.

26. A multilayer coextruded frangible film according to claim 21, wherein said film has an unrestrained linear thermal shrinkage in the machine direction or the transverse direction of less than 5% at 100° C. as measured in accordance with ASTM D-2732 test method.

27. A multilayer coextruded frangible film according to claim 21, wherein said film has an oxygen transmission rate of from about 0.01-1.00 cm$^3$/100 in.$^2$ (0.1550-15.50 cm$^3$/m$^2$) as measured in accordance with ASTM D-3985-81 test method.

28. A multilayer coextruded frangible film according to claim 21, further comprising a fifth layer; wherein said fifth layer comprises a material selected from the group consisting of polyethylene, polybutene copolymer, anhydride-modified polyolefin, and blends thereof.

29. A multilayer coextruded frangible film according to claim 28, wherein said film is thermoformable.

30. A multilayer coextruded frangible film according to claim 28, further comprising a sixth layer; wherein said sixth layer comprises an ethylene/α-olefin copolymer.

31. A multilayer coextruded frangible film according to claim 30, further comprising a seventh layer; wherein said seventh layer comprises an ethylene/α-olefin copolymer.

32. A multilayer coextruded frangible film according to claims 21, 28, 30, or 31; wherein said film forms a package adapted for storing and cooking food items.

33. A multilayer coextruded frangible film according to claim 32, wherein said first layer of said film is heat sealed to itself to form said package.

34. A multilayer coextruded frangible film according to claim 32, wherein said first layer of said film is heat sealed to a second film to form said package.

35. A multilayer coextruded frangible film according to claim 34, wherein said second film is thermoformable.

36. A multilayer coextruded frangible film for cook-in applications comprising;

(a) a first layer, a second layer, a third layer, a fourth layer, a fifth layer, a sixth layer, and a seventh layer;

(b) wherein said first layer comprises a material selected from the group consisting of ethylene/α-olefin copolymer, propylene/ethylene copolymer and blends thereof;

(c) wherein said second layer comprises a first blend component selected from the group consisting of polypropylene, polybutene copolymer, and blends thereof; said first blend component is immiscible with a second blend component; said second blend component comprises a material selected from the group consisting of ethylene/α-olefin copolymer, propylene/ethylene copolymer, ethylene/vinyl acetate copolymer, polyethylene, anhydride-modified polyolefin, ionomer, anhydride-modified ethylene/vinyl acetate copolymer, ethylene/methyl acrylate copolymer, ethylene/ethyl acrylate copolymer, anhydride-modified ethylene/α-olefin copolymer, and blends thereof; wherein said second layer is disposed between said first layer and said third layer;

(d) wherein said third layer comprises a material selected from the group consisting of polyethylene, anhydride-modified polyolefin, ethylene/vinyl alcohol copolymer, polyamide and blends thereof;

(e) wherein said fourth layer comprises a material selected from the group consisting of ethylene/vinyl alcohol copolymer, polyamide, polyethylene, anhydride-modified polyolefin and blends thereof;

(f) wherein said fifth layer comprises a material selected from the group consisting of polyethylene, polybutene copolymer, anhydride-modified polyolefin, and blends thereof;

(g) wherein said sixth layer comprises an ethylene/α-olefin copolymer;

(h) wherein said seventh layer comprises an ethylene/α-olefin copolymer; and (i) wherein said second layer is adapted to peel from said first layer or said third layer under a force of between 1000-2500 g/in. (393.7-984.3 g/cm) as measured in accordance with the Standard Heat Seal Strength Test.

37. A multilayer coextruded frangible film according to claim 36, wherein said first layer is free of polybutene copolymer and is a heat-sealable, outer-film layer.

38. A multilayer coextruded frangible film according to claim 36, wherein said ethylene/α-olefin copolymer of said first layer has a melting point of less than 105° C. as measured in accordance with ASTM D-3418, a molecular weight distribution $M_w/M_n$ of from 0.05-2.7 as measured in accordance with ASTM D-3593-80, and a melt index of from 5.0-34 g/10 min. at 190° C. as measured in accordance with ASTM D-1238 Condition 190° C./2.16 kg.

39. A multilayer coextruded frangible film according to claim 36, wherein said film is thermoformable.

40. A multilayer coextruded frangible film according to claim 36, wherein said anhydride-modified polyolefin comprises a maleic anhydride-grafted copolymer of between 0.05-1% by weight of maleic anhydride and between 99.95-99% by weight of polyolefin relative to the total weight of said anhydride-modified polyolefin.

41. A multilayer coextruded frangible film according to claim 36, wherein said film has an unrestrained linear thermal shrinkage in the machine direction or the transverse direction of less than 5% at 100° C. as measured in accordance with ASTM D-2732 test method.

42. A multilayer coextruded frangible film according to claim 36, wherein said film has an oxygen transmission rate of from about 0.01-1.00 cm$^3$/100 in.$^2$ (0.1550-15.50 cm$^3$/m$^2$) as measured in accordance with ASTM D-3985-81 test method.

43. A multilayer coextruded frangible film according to claim 36; wherein said film forms a package adapted for storing and cooking food items.

44. A multilayer coextruded frangible film according to claim 43, wherein said first layer of said film is heat sealed to itself to form said package.

45. A multilayer coextruded frangible film according to claim 43, wherein said first layer of said film is heat sealed to a second film to form said package.

46. A multilayer coextruded frangible film according to claim 45, wherein said second film is thermoformable.

47. A multilayer coextruded frangible film according to claims 1, 3, 21 or 36, wherein said second layer is adapted to peel from said first layer or said third layer under a force of between 1000-2500 g/in. (393.7-984.3 g/cm) as measured in accordance with the Standard Heat Seal Strength Test after said film is submerged in water at 100° C. for one hour.

* * * * *

UNITED STATES PATENT AND TRADEMARK OFFICE
CERTIFICATE OF CORRECTION

PATENT NO. : 7,276,269 B2 Page 1 of 1
APPLICATION NO. : 10/732023
DATED : October 2, 2007
INVENTOR(S) : Amy Lynn Kraimer and Gregory Robert Pockat It is certified that error appears in the above-identified patent and that said Letters Patent is hereby corrected as shown below:

Column 1, line 42, "use a" should read --use of a--; line 47, "a" should read --an--.
Column 2, line 34, "layer may" should read --layer and may--.
Column 3, line 21, "comprises" should read --comprise--; line 37, "a" should read --an--; lines 49, 52, and 55, "example a" should read --example of a--.
Column 4, line 2, "polymerization of reaction" should read --polymerization reaction--; line 45, "therethough" should read --there through--.
Column 5, line 3, "have an $O_2$" should read --have $O_2$--; line 40, "trough" should read --through--.
Column 6, line 11, "irradiated" should read --irradiate--.
Column 7, line 10, "those skill" should read --those of skill--; line 55, "catalyzed" should read --catalysis--; lines 56, 61, and 66, "carbons" should read --carbon--.
Column 8, line 16, "$M_wM_w$" should read --$M_wM_n$--; line 67, "those skill" should read --those of skill--.
Column 10, lines 12 and 64, "details the" should read --details of the--; lines 52 and 56, "E.I de Pont" should read --E.I. du Pont--.
Column 11, line 42, "details the" should read --details of the--.
Claim 6, line 60 through 61, "99.95-99%" should read --99-99.95%--.
Claim 25, line 27 through 28, "99.95-99%" should read --99-99.95%--.
Claim 40, line 55 through 56, "99.95-99%" should read --99-99.95%--.

Signed and Sealed this

Twenty-third Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,276,269 B2
APPLICATION NO. : 10/732023
DATED : October 2, 2007
INVENTOR(S) : Amy Lynn Kraimer and Gregory Robert Pockat It is certified that error appears in the above-identified patent and that said Letters Patent is hereby corrected as shown below:

Column 1, line 42, "use a" should read --use of a--; line 47, "a" should read --an--.
Column 2, line 34, "layer may" should read --layer and may--.
Column 3, line 21, "comprises" should read --comprise--; line 37, "a" should read --an--; lines 49, 52, and 55, "example a" should read --example of a--.
Column 4, line 2, "polymerization of reaction" should read --polymerization reaction--; line 45, "therethough" should read --there through--.
Column 5, line 3, "have an $O_2$" should read --have $O_2$--; line 40, "trough" should read --through--.
Column 6, line 11, "irradiated" should read --irradiate--.
Column 7, line 10, "those skill" should read --those of skill--; line 55, "catalyzed" should read --catalysis--; lines 56, 61, and 66, "carbons" should read --carbon--.
Column 8, line 16, "$M_wM_w$" should read --$M_wM_n$--; line 67, "those skill" should read --those of skill--.
Column 10, lines 12 and 64, "details the" should read --details of the--; lines 52 and 56, "E.I de Pont" should read --E.I. du Pont--.
Column 11, line 42, "details the" should read --details of the--.
Column 13, Claim 6, line 60 through 61, "99.95-99%" should read --99-99.95%--.
Column 15, Claim 25, line 27 through 28, "99.95-99%" should read --99-99.95%--.
Column 16, Claim 40, line 55 through 56, "99.95-99%" should read --99-99.95%--.

This certificate supersedes the Certificate of Correction issued September 23, 2008.

Signed and Sealed this

Fourteenth Day of October, 2008

JON W. DUDAS
*Director of the United States Patent and Trademark Office*